United States Patent [19]

Monteith

[11] Patent Number: 4,825,889
[45] Date of Patent: May 2, 1989

[54] VEHICLE SUN SHADE

[76] Inventor: John B. Monteith, 1563 Glenwood Rd., DeLand, Fla. 32720

[21] Appl. No.: 22,861

[22] Filed: Mar. 6, 1987

[51] Int. Cl.$^4$ .............................................. E04H 15/06
[52] U.S. Cl. ...................................... 135/88; 296/136
[58] Field of Search ..................... 135/88; 296/136, 98

[56] References Cited

U.S. PATENT DOCUMENTS 4,432,581  2/1984  Guma ................................ 135/88 X
4,684,165  8/1987  Becker .............................. 135/88 X Primary Examiner—J. Karl Bell
Attorney, Agent, or Firm—Kerkam, Stowell, Kondracki & Clarke

[57] ABSTRACT

A vehicle sun shade is disclosed, formed from a rectangular water impervious non-transparent sheet having a width approximately equal to the width of the vehicle to be protected, and a length greater than the length of the vehicle. Flexible tie strips formed of an elastic cord with plastic coated hooks, are secured at each of the corners of the rectangular sheet for attaching the sheet to the vehicle. Light weight spacers preferably being four in number, and of hollow construction, are inserted between the inner surface of the sheet and the outer surface of the vehicle.

6 Claims, 3 Drawing Sheets

FREE FLOWING AIR

VEHICLE SUN SHADE

FIELD OF THE INVENTION

This invention is directed to a vehicle sun shade of the portable type which reduces temperatures within a vehicle and protects a vehicle's finish from sun damage.

BACKGROUND OF THE INVENTION

Sun shades or screens for vehicles are known in the art and exemplary of such prior art structures are those disclosed in the following U.S. Patents:

| U.S. Pat. No. 3,992,053 | Hrytzak et al |
| U.S. Pat. No. 3,316,012 | Thier |
| U.S. Pat. No. 2,248,655 | Bila |
| U.S. Pat. No. 2,801,667 | Curran |
| U.S. Pat. No. 4,184,501 | Johnson |

It is a primary object of the present invention, to provide a portable cover that can be attached to an automobile, truck, tractor, recreation vehicle, camper, van, boat, airplane, motorcycle, Jeep, dune buggy, hunting vehicle, and the like. The portable cover will provide shade from the sun to lower the internal temperature of the vehicle and provide protection from the sun's rays and from other atmospheric elements.

It is another primary object to provide such a portable cover that is constructed from waterproof and, for example, camouflage material that can be easily and quickly installed, and easily and quickly removed and stored in the vehicle.

SUMMARY OF THE INVENTION

The invention may be defined as a vehicle sun shade comprising a rectatngular, water impervious, non-transparent sheet, having a width approximately equal to the width of the vehicle to be protected and a length greater than the length of such vehicle. The invention also includes flexible tie strips secured at each corner of the rectangular sheet and four cylindrical non-metallic light weight spacer means fit inside of sleeves fashioned into the fabric engaging the top of the vehicle to be protected and providing a free-air space between the vehicle and the inside surface of the rectangular sheet. Preferrably, the cylindrical members are of hollow construction and may comprise plastic tubing that will not react with the vehicle's paint.

BRIEF DESCRIPTION OF THE DRAWING

The invention will be more particularly described in reference to the accompanying drawing wherein.

DETAILED DESCRIPTION OF THE INVENTION

Figure 1:
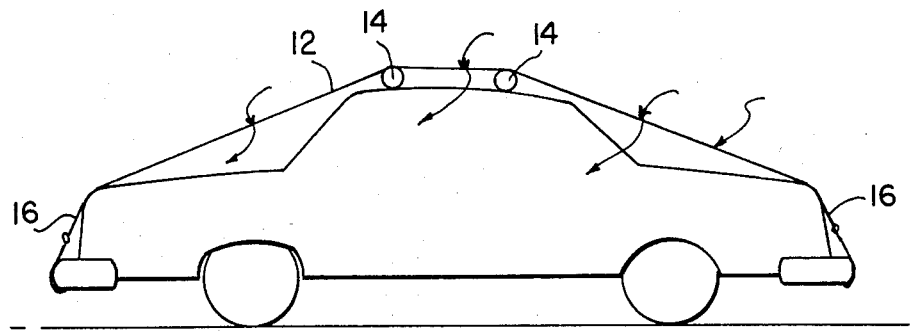
FIG. 1 is a somewhat diagramatic side elevational view of a vehicle having the sun shade of the invention positioned thereon.
Figure 4:
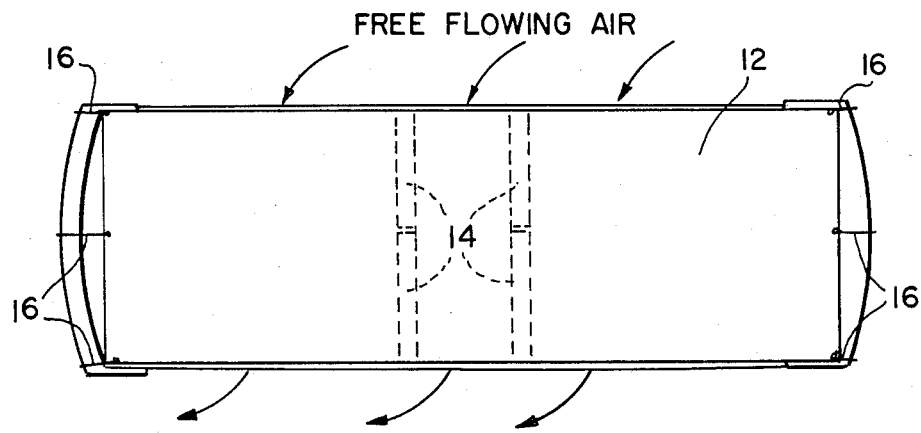
FIG. 4 is a top plan view of the structure shown in FIG. 1.

Referring to the drawing, the sun shade generally designated 10, comprises two basic elements; a sheet of water impervious, non-transparent material 12, and spacer elements 14.

The water impervious non-transparent sheet 12 is preferrably made of fabric and a suitable fabric may comprise water repellant cotton duct material which may be plain or colored in a camouflage configuration. Water repellant nylon is also very suitable material, and can be purchased in fifty-four and sixty inch standard widths.

Depending on the vehicle to be shaded, the fabric sheet 12 is configured as a rectangle having a width approximately equal to the width of the vehicle and a length greater than the length of the vehicle.

At each corner and center of each end of the fabric sheet 12, is provided a flexible tie member 16. The tie members 16 are secured to the corners of the sheet 12 such as by stitching. The ties may be rivoted if the rivots are of the non-metallic type. The non-metallic fasteners are used to prevent damage to the vehicle finish during installation and removal of the shade and that which might be caused during wind storms.

In a preferred form of the invention, the three flexible ties comprise an elastic cord 16 having at one end affixed, a plastic covered hook 18 and at the opposite end, a knot 20 is formed in the end of the elastic cord after the cord is threaded through a plastic grommet formed in the leading and trailing edges of the cover 12 at each of the positions for a tie member. After the elastic cord 16 is threaded through a plastic grommet 22, the knot 20 would be formed.

Figure 2:
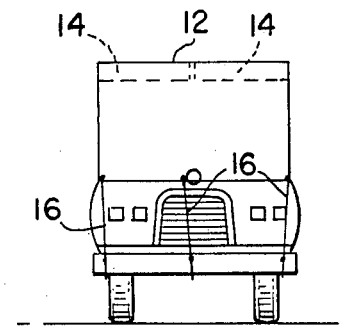
FIG. 2 is a front view of the vehicle illustrated in FIG. 1.
Figure 3:
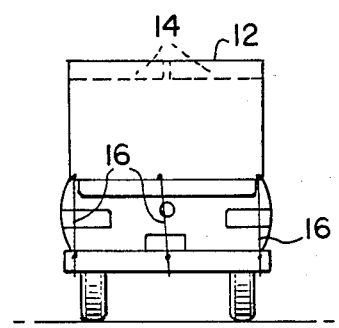
FIG. 3 is the rear view of the vehicle illustrated in FIGS. 1 and 2.

In FIG. 1, it is shown that the fabric sheet 12 is basically out of contact with the vehicle surface except adjacent the two long ends where the fabric curves sharply downward to be tied by the tie down strips 16, to, for example, an automobile's front and rear bumpers. The spacing of the sheet 12 from the vehicle surface greatly assists in maintaning the inside temperature of the vehicle substantially lower, than without the sun shade as air motion between the outer surface of the vehicle and the inner surface of the sheet 12 provides an important feature of the present invention. The sheet 12 is maintained in it's illustrated spaced relation by the cylindrical, non-metallic, light weight spacer member 14 which in a preferred form of the invention are in number and positioned approximately as illustrated in FIG. 2 of the drawing and inside a sleeve 13 fashioned into the sheet 12 by a seam stitched from side to side.

Again, in a preferred from of the present invention, the spacer members 14 are of hollow configuration, thus reducing heat transfer from the inner surface of the sheet 12 to the surface of the vehicle and permitting some circulation of air there through, assisting in setting up air flow currents between the inner surface of the shade and the outer surface of the top of the vehicle, again assisting in maintaining the interior of the vehicle at a cooler temperature. In the drawing air flow directional arrows are shown.

To deploy the sun shade, the sheet material 12 is placed over the top structure of the vehicle and the hooks which are attached by elastic to the tie down strips are conveniently attached to the front and rear bumpers, if the vehicle is an automobile. Thereafter, the spacers 14 being an integral part of the sunshade, are appropriately spaced under the inner surface of the sheet member and with the tie down strap, being attached by an elastic cord and a hook at each, tensions the fabric sheet and retains the fabric sheet out of contact with the major portions of the vehicle. A prototype sun shade constructed in accordance with the teachings of the present invention was installed in less than one minute and removed in less than thirty seconds.

Figure 5:
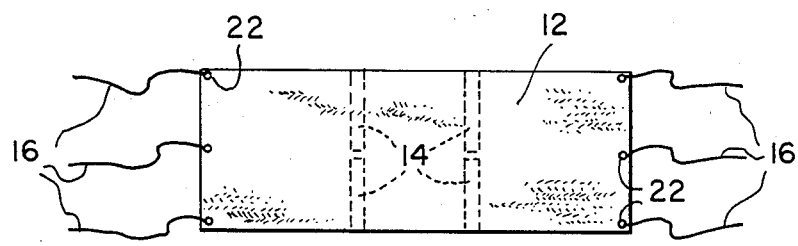
FIG. 5 illustrates the sun shade in plan and removed from a vehicle.
Figure 6:
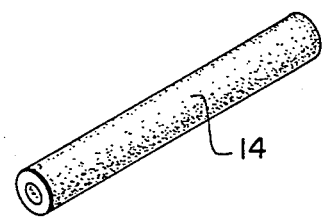
FIG. 6 is a perspective view of one of the preferrably four cylindrical elements which support the sun shade in spaced relation from the top of the vehicle to be protected.
Figure 7:
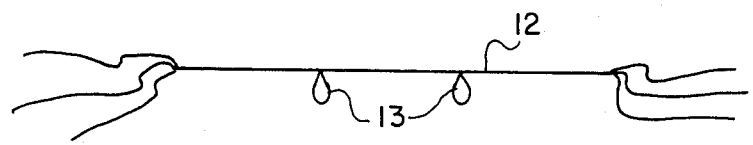
FIG. 7 is side elevational view of the structure shown in FIG. 5.
Figure 8:
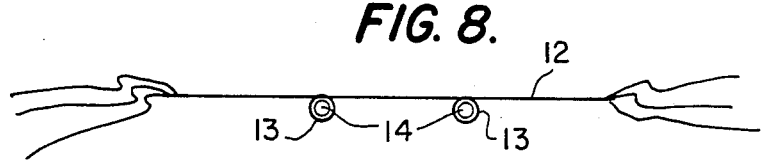
FIG. 8 is a view like FIG. 7, with the rolls 14 inserted in the sleeves.
Figure 9:
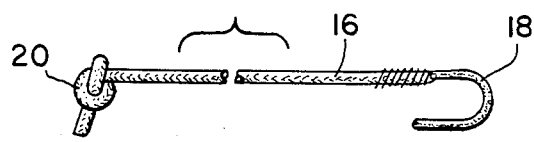
FIG. 9 is a perspective view of a preferred form of tie down.

As best shown in FIG. 5, the spacer members 14 are disposed in a middle portion of the sheet 12 and are substantially spaced in the lengthwise direction from the tie strips 16. Additionally, it will be seen that each of the spacer members 14 is preferably directly in line with another of the spacer members 14 such that the axes of the spacer members are likewise directly in line and extending in the width direction.

Figure 10:
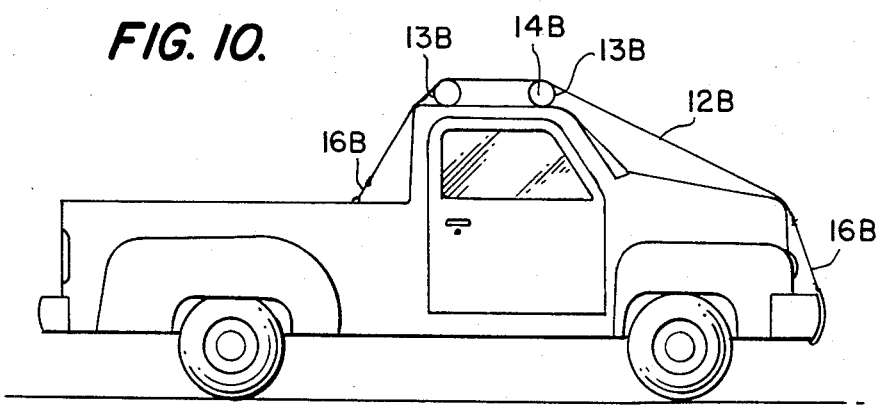
FIG. 10 is a partial side elevation of a pick-up truck and a cover of the invention.

Referring now to FIG. 10, there is illustrated the use of the cover sheet 12b on a pick-up truck. In this form, there are two loops 13b carrying the pair of light weight rolls 14b.

Figure 11:
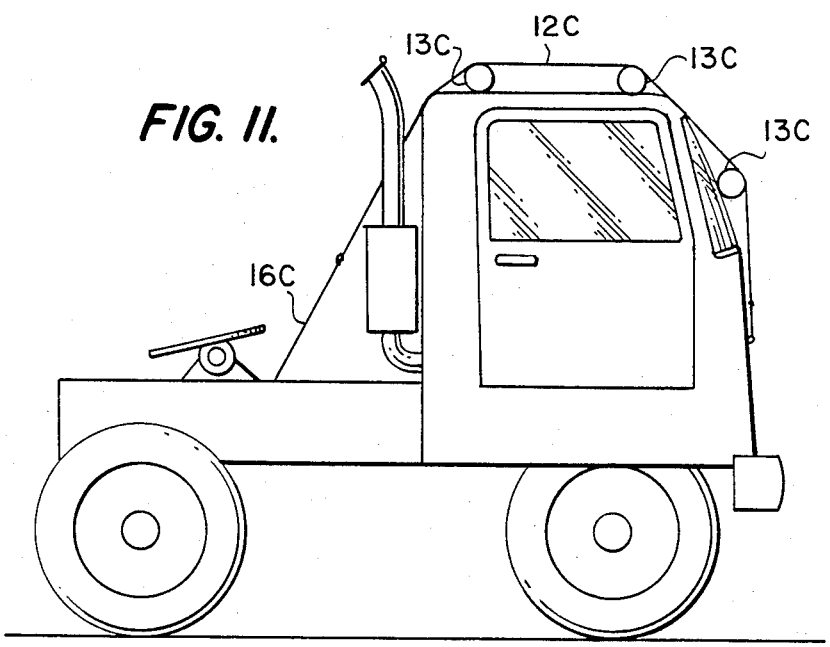
FIG. 11 illustrates the attachment of a cover to a cab of a semi-trailer.

In FIG. 11, there is illustrated the cover 12c formed to cover the cab portion of a tractor trailer. In this form of the invention, the coverage will probably be provided with three loops 13c to properly maintain air space on the cab's roof and windshield.

Figure 12:
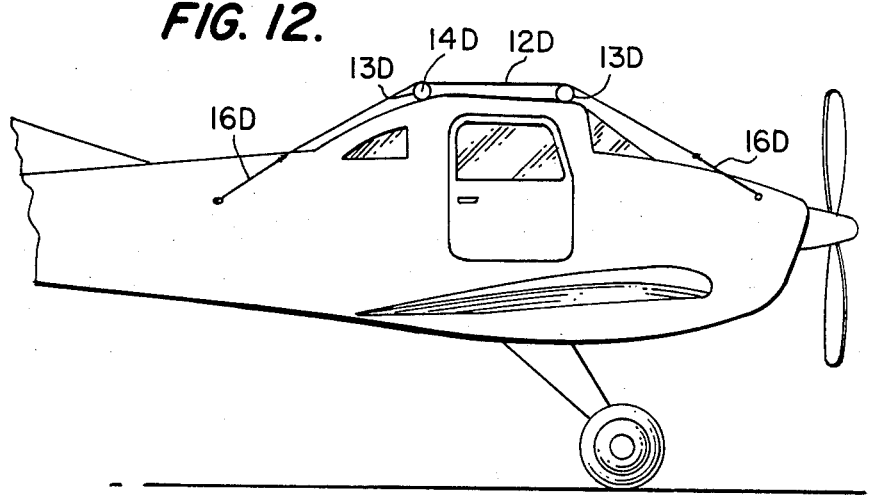
FIG. 12 illustrates the cover applied to a small aircraft.

Referring to FIG. 12, the cover 12d has two loops 13d in which are rolls 14d and the tie strips 16d as discussed in reference to the other forms of the invention.

With the increased use of plastic materials interiorly of automobiles and the like vehicles, the cooler temperatures maintained by the use of the sun shade should prolong the useful life of the plastic materials.

From the foregoing description of preferred and alternate forms of the present invention, what is desired to be claimed is set forth in the appended claims.

1. A vehicle sun shade comprising a rectangular water impervious non-transparent sheet having a width approximately equal to the width of the vehicle to be protected and a length greater than the length of the vehicle, flexible tie strips formed of elastic cord, with plastic coated hooks at free ends and secured at each corner of the rectangular sheet, four cylindrical non-metallic light weight spacer members engaging the top of the vehicle to be protected and maintaining the inside surface of the rectangular sheet in spaced relation from the top of the vehicle, and a plurality of sleeves secure to the inside surface of the rectangular sheet and securing said cylindrical non-metallic light weight spacer member to the rectangular sheet with axes of said cylindrical non-metallic light weight spacer members extending along the width direction of the rectangular sheet.

2. The vehicle sun shade as defined in claim 1 wherein the rectangular sheet comprises cotton duct.

3. The vehicle sun shade as defined in claim 1 wherein the rectangular sheet comprises nylon.

4. The vehicle sun shade as defined in claim 1 wherein the light weight spacer members comprise plastic and the are of hollow construction.

5. The vehicle sun shade as defined in claim 1 wherein each of the cylindrical non-metallic light weight spacer members is disposed in a middle portion of the rectangular sheet spaced substantially along the length of the rectangular sheet from said tie strips.

6. The vehicle sun shade as defined in claim 1 wherein each of the cylindrical non-metallic light weight spacer members has an axis directly in line with a corresponding axis of another one of the cylindrical nonmetallic light weight spacer members.

* * * * *

UNITED STATES PATENT AND TRADEMARK OFFICE
CERTIFICATE OF CORRECTION

PATENT NO. : 4,825,889

DATED : May 2, 1989

INVENTOR(S) : MONTEITH, John B.

It is certified that error appears in the above-identified patent and that said Letters Patent is hereby corrected as shown below:

Column 4, line 18, Claim 1, change "secure" to --secured--.

Column 4, line 31, Claim 4, delete the word "the".

Signed and Sealed this

Fifth Day of December, 1989

Attest:

JEFFREY M. SAMUELS

*Attesting Officer*    *Acting Commissioner of Patents and Trademarks*